Dec. 29, 1942.　　　　G. WALD　　　　2,306,656
OPTICAL TELEVISION
Filed March 30, 1939　　　8 Sheets-Sheet 1

WITNESSES:
Hansli Jerhard
B. J. Hunter

INVENTOR
George Wald
BY
Kingsland, Rogers + Ezell
ATTORNEYS

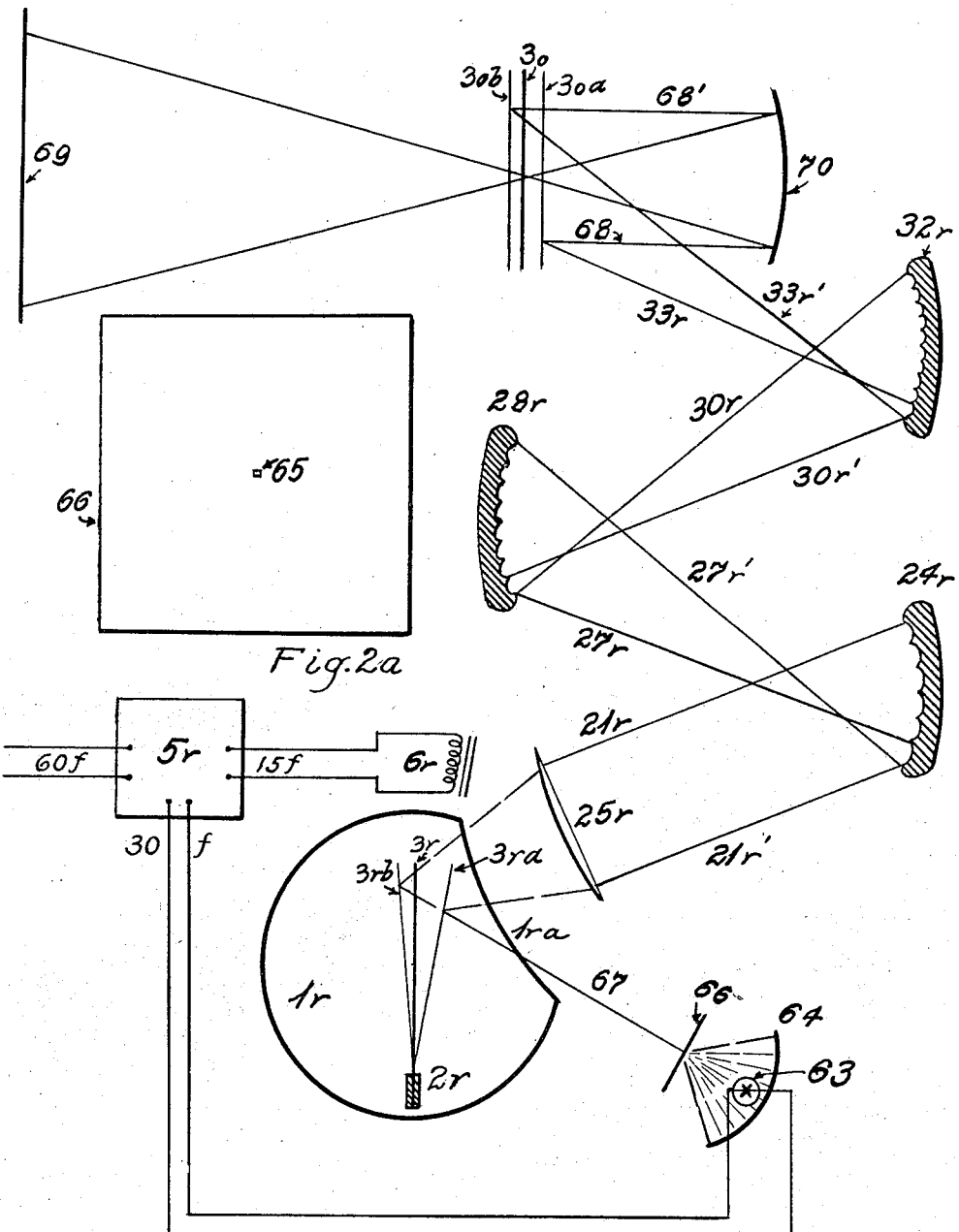

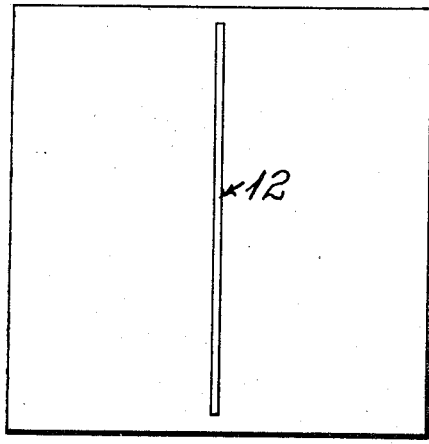# # 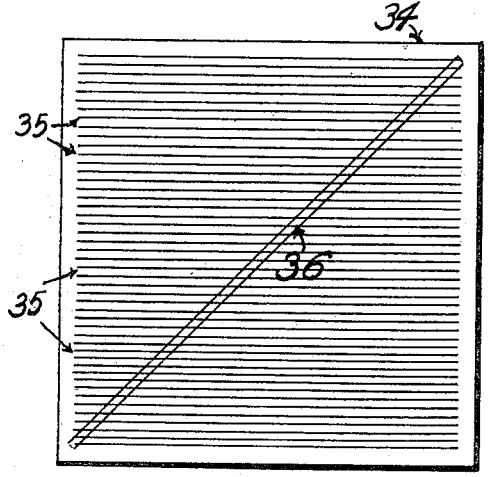# 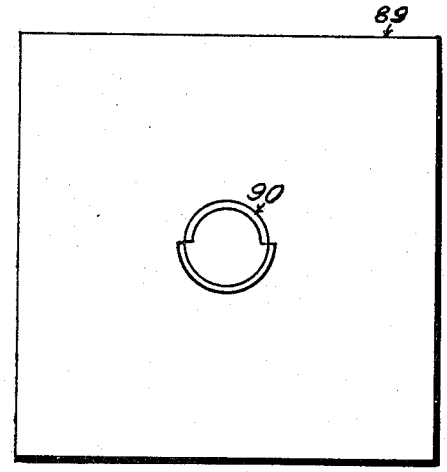# 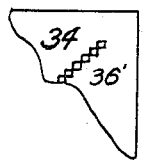# 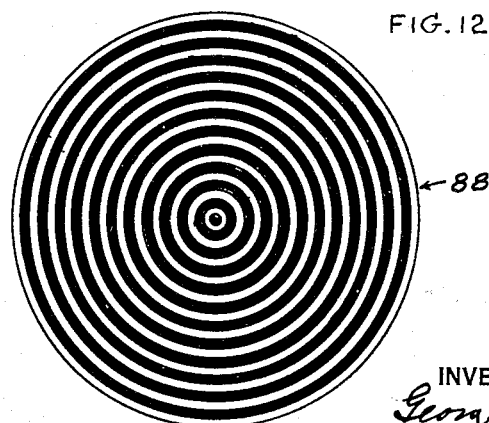

Dec. 29, 1942.   G. WALD   2,306,656
OPTICAL TELEVISION
Filed March 30, 1939   8 Sheets-Sheet 4

WITNESSES

INVENTOR
George Wald
BY
ATTORNEYS

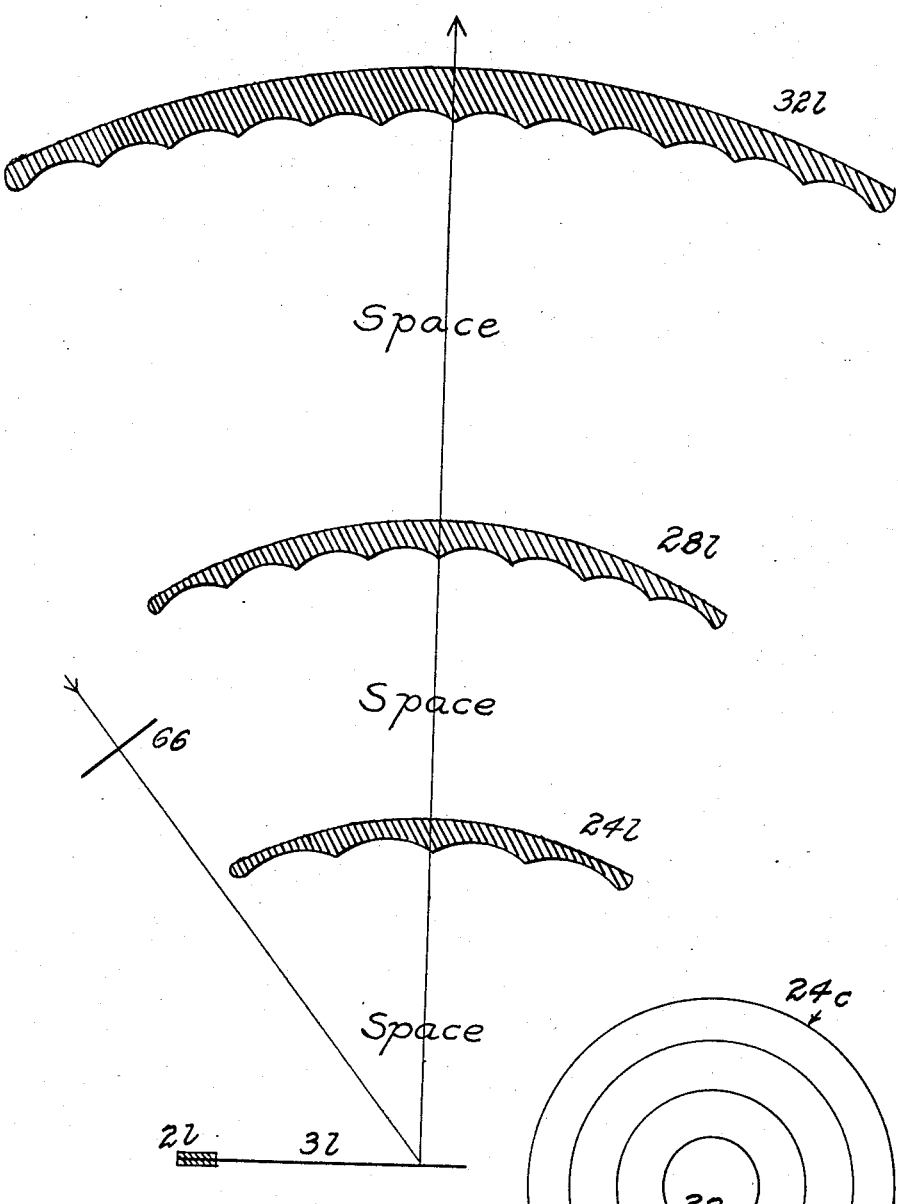

Dec. 29, 1942.	G. WALD	2,306,656
OPTICAL TELEVISION
Filed March 30, 1939	8 Sheets-Sheet 6
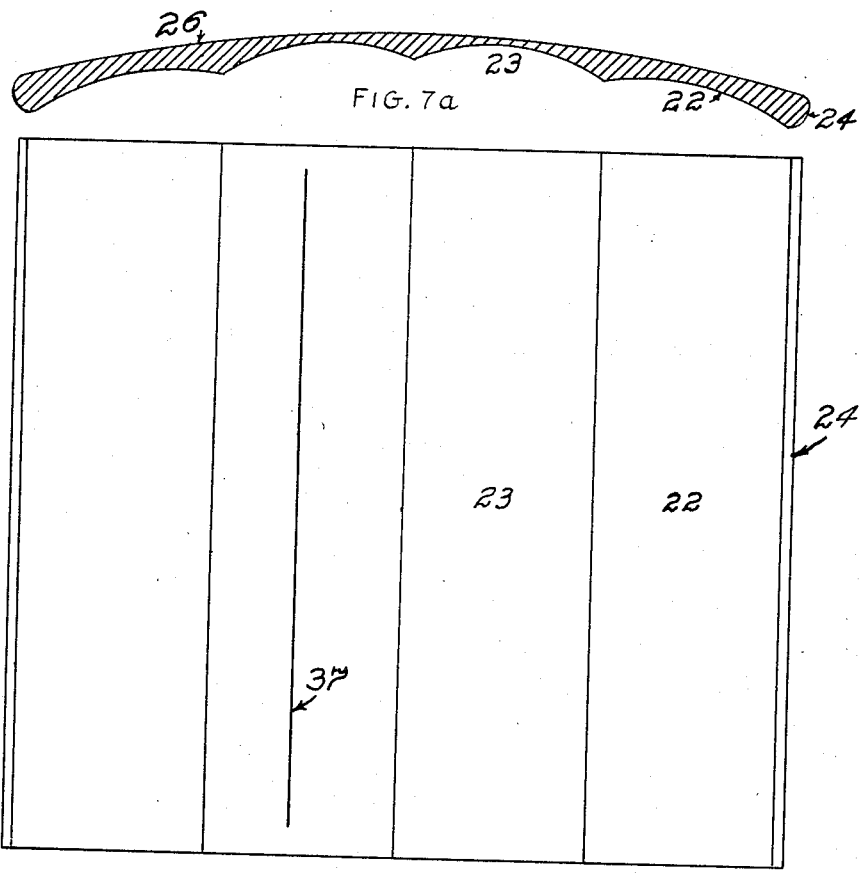
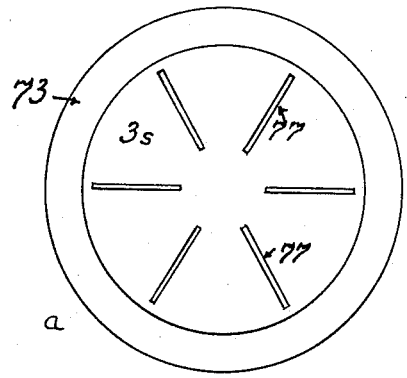
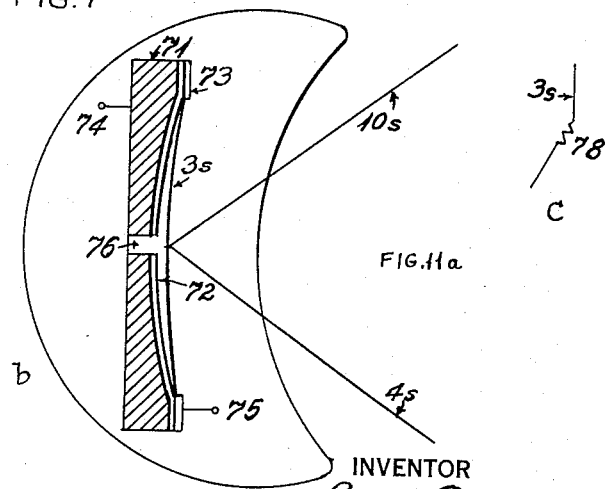

Dec. 29, 1942.  G. WALD  2,306,656
OPTICAL TELEVISION
Filed March 30, 1939  8 Sheets-Sheet 7
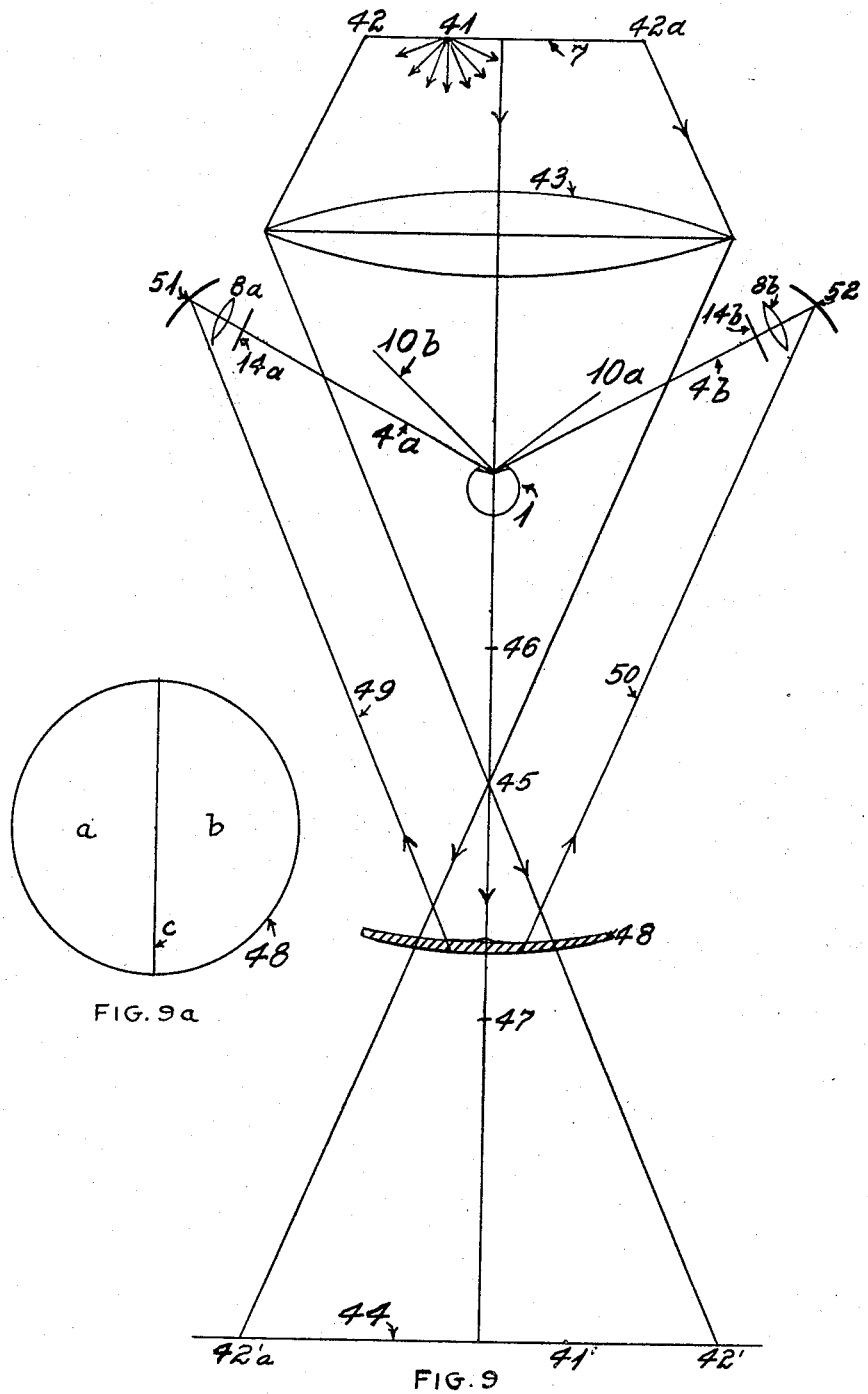

Dec. 29, 1942.            G. WALD            2,306,656
OPTICAL TELEVISION
Filed March 30, 1939            8 Sheets-Sheet 8

WITNESSES:            INVENTOR
            George Wald
            BY Kingsland, Rogers & Ezell
            ATTORNEYS Patented Dec. 29, 1942

2,306,656

UNITED STATES PATENT OFFICE 2,306,656

OPTICAL TELEVISION

George Wald, St. Petersburg, Fla.

Application March 30, 1939, Serial No. 264,876

21 Claims. (Cl. 178—7.6)

This invention relates to apparatus and system for producing, transmitting, receiving and reproducing optical television.

An object of this invention is to produce a television system, especially the receiver, at low cost and yet produce a large, clear, bright and natural image of high fidelity.

Another object of this invention is to provide an optical scanning means wherein the image may be resolved into a large number of lines, evolutions, or elemental areas, thereby reproducing a large, clear bright and natural image of high fidelity.

Another object of this invention is to provide means to scan an image optically and resolve it optically into any number of elemental areas, converting the light rays reflected from these elemental areas into electrical impulses, amplifying, transmitting, receiving and reamplifying same, influencing a source of light by these electrical impulses to produce light rays of an intensity corresponding to those scanned at the transmitter, reflecting these light rays upon an optical scanning system to reproduce a large, clear, bright and natural image of high fidelity.

Another object of this invention is to provide at the receivers an optical scanning system that scans the image modulated light rays or beam, in light form, thereby enabling an intense source of light, such as an arc-light, crater-tube, etc., to be modulated by the image signal and reproduce a large, bright, clear and natural image of high fidelity.

Another object of this invention is to provide an optical scanning means wherein the image may be scanned line by line, or evolution by evolution, alternately thereby interlacing the scanning of the image, and produce a large, bright, clear and natural image of high fidelity.

Another object of this invention is to provide an optical scanning system wherein relative low voltage electric currents may be employed to scan the image.

Another object of this invention is to scan the image, at the transmitter, by a single low frequency scanning current and still resolve the image into ordinate and coordinate elements. While at the receiver, to provide means where an intense concentrated light source modulated by the image impulse may be made to scan by a single low frequency current, the ordinate and coordinate lines in synchronism with that at the transmitter and thereby reproducing a large, clear, bright and natural image of high fidelity.

Another object of this invention is to provide a simple method to properly frame the image.

Still another object of this invention is to provide means wherein house-lighting alternating current may be utilized to synchronize the optical scanning means at the transmitter with that at the receiver, even though the development of the electric currents source at the receiver may differ from the source of the electric current produced at the transmitter.

There are other objects of my invention which, together with the foregoing, will be described in the detailed specifications which follow:

It is well known to the art that in mechanical scanning a bright image can be produced, as the image is reproduced from reflected light itself. However, mechanical scanning has the disadvantage of being extremely limited in the number of elemental areas it can produce to the frame, hence an unclear and small image results. On the other hand, electronic scanning has the disadvantage of requiring the image modulated electrons to be changed into light, by fluorescence, resulting in weak light and poor image. In my optical television scanning I have developed a method wherein the number of elemental areas per image is practically limitless, and the light strength abundant.

To accomplish the above results, I scan, at the transmitter, the image ordinates, alternately, in an interlaced fashion; thus each frame has but half the number of ordinates a whole frame has, but it takes two frames to each complete frame. I then resolve each interlaced image into ordinates, each ordinate forming a complete and distinct separate image by itself. A prime mover operating by either electromagnetic, electrostatic, electro-physical, electro-chemical or electro-optical means sweeps the image ordinate light rays by a slot and through an optical system, so that one at a time, all of the ordinates are made to scan a screen that automatically selects each point of the ordinate and reflects it in turn, on a photoelectric cell, to produce a television current. The optical scanning system consists of rectangular or square, lenses or reflectors, ground longitudinally on one face either to a concave or convex surface, while on the other face they have several ground bi-focal faces. These multi-focal lenses or reflectors are ground in a bi-focal fashion, and so arranged in the system that the rays pass on from one lens, or reflector, to the succeeding one. As the rays sweep by each bi-focal face, they are refracted, or reflected, and made to sweep by, the entire succeeding lens or reflector. Thus each multi-focal lens becomes a multiple of the succeeding lens or reflector, in the system. To produce 240 lines per interlaced frame I employ three lenses, one with four, one with six and one with ten bi-focal faces forming 4×6×10 or 240 lines per interlaced frame, or 480 lines per complete frame. The television electric impulses are amplified and transmitted each interlaced frame after the other.

At the receiver, I cause the electric impulses to modulate one light source such as an arc-light, crater-tube, etc. Nearly all the rays from this light are condensed to a focal point and made optically to travel and produce a straight line, at such a rate, as to prescribe an image ordinate. The ordinates are swept by a screen and appear each adjacent to the other thereby reproducing the image. The scanning is done by the 60-cycle house current, at low voltage, and is produced in an interlaced fashion.

The full advantages of the invention will be apparent from the following detail description, taken in connection with the accompanying drawings, in which:

Fig. 2 is a diagrammatic view of an optical scanning style television receiver.

Fig. 2a is a side view of the screen used at the receiver.

Fig. 3 is a side view of the screen employed to resolve the image into separate ordinates.

Fig. 4 is a side view of a part of the screen (enlarged) employed to produce separate interlaced ordinates of the image.

Fig. 6 is a diagrammatic view of an optical scanning lens system.

Fig. 6a is a top view of a lens or reflector employed in spiral or circular scanning.

Fig. 7 is a top view of either a scanning lens or reflector.

Fig. 7a is a cross section of a scanning reflector.

Fig. 8 is a side view of a screen employed to reduce line areas into elemental areas of the image.

Fig. 8a is a side view (in part) of an alternate slot that may be used.

Fig. 9 is a diagrammatic view of means employed to produce optically a plurality of images from one image.

Fig. 9a is front view of a split reflector.

Fig. 11, a, is a front view of an electrostatic prime moving element.

Fig. 11, b, is a cross sectional view of an electrostatic prime mover in an exhausted tube.

Fig. 11, c, is a sectional view of a part of the diaphragm.

Fig. 12 is a side view of a screen employed in connection with circular or spiral optical scanning.

Fig. 13 is a side view of an interlacing screen employed to produce interlaced circular or spiral scanning.

Figures 14, 14A, 15:
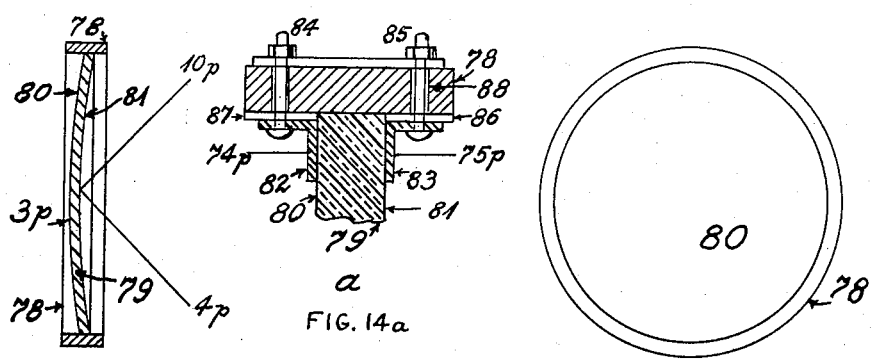

Fig. 14 is a cross sectional view of an electrophysical prime mover, and a is a greatly enlarged section thereof.

Fig. 15 is a side view of the element shown in Fig. 14.

Figure 16:
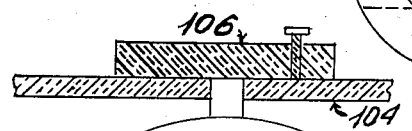
Figure 16A:
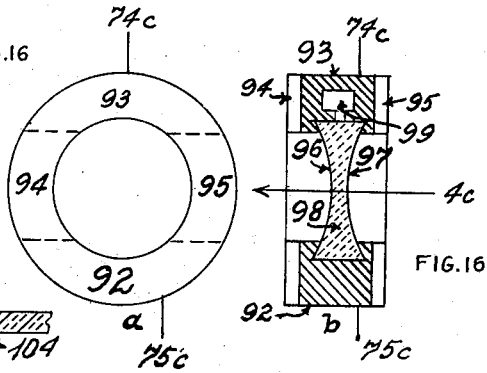

Fig. 16, a, is a side view and b, a cross sectional view of an electro-chemical or electro-optical prime mover.

Figure 17A:
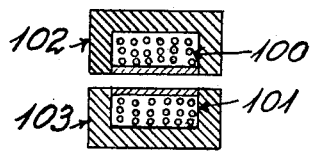
Figure 17:
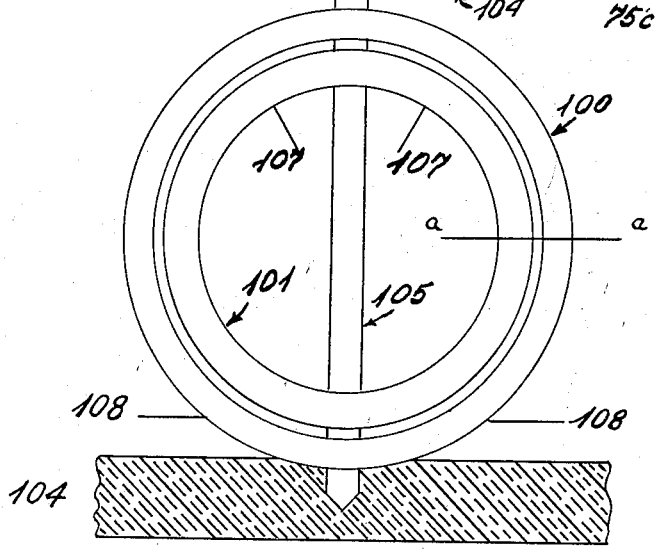

Fig. 17 is partly a side view and partly a cross-sectional view of the device used to frame the image.

Fig. 17a is a cross sectional view of same along the line a—a.

Figure 18:
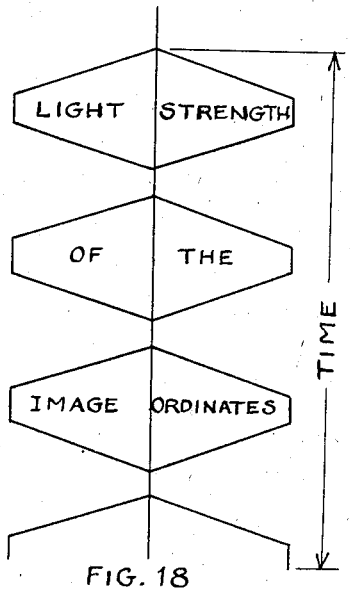

Fig. 18 is a graphic view of the light-strength produced by the ordinates of the image as they are reflected in succession after leaving the screen shown in Fig. 3.

Figure 19:
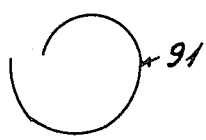

Fig. 19 shows a spiral slot that may be employed if desired in connection with circular or spiral scanning.

Figure 1:
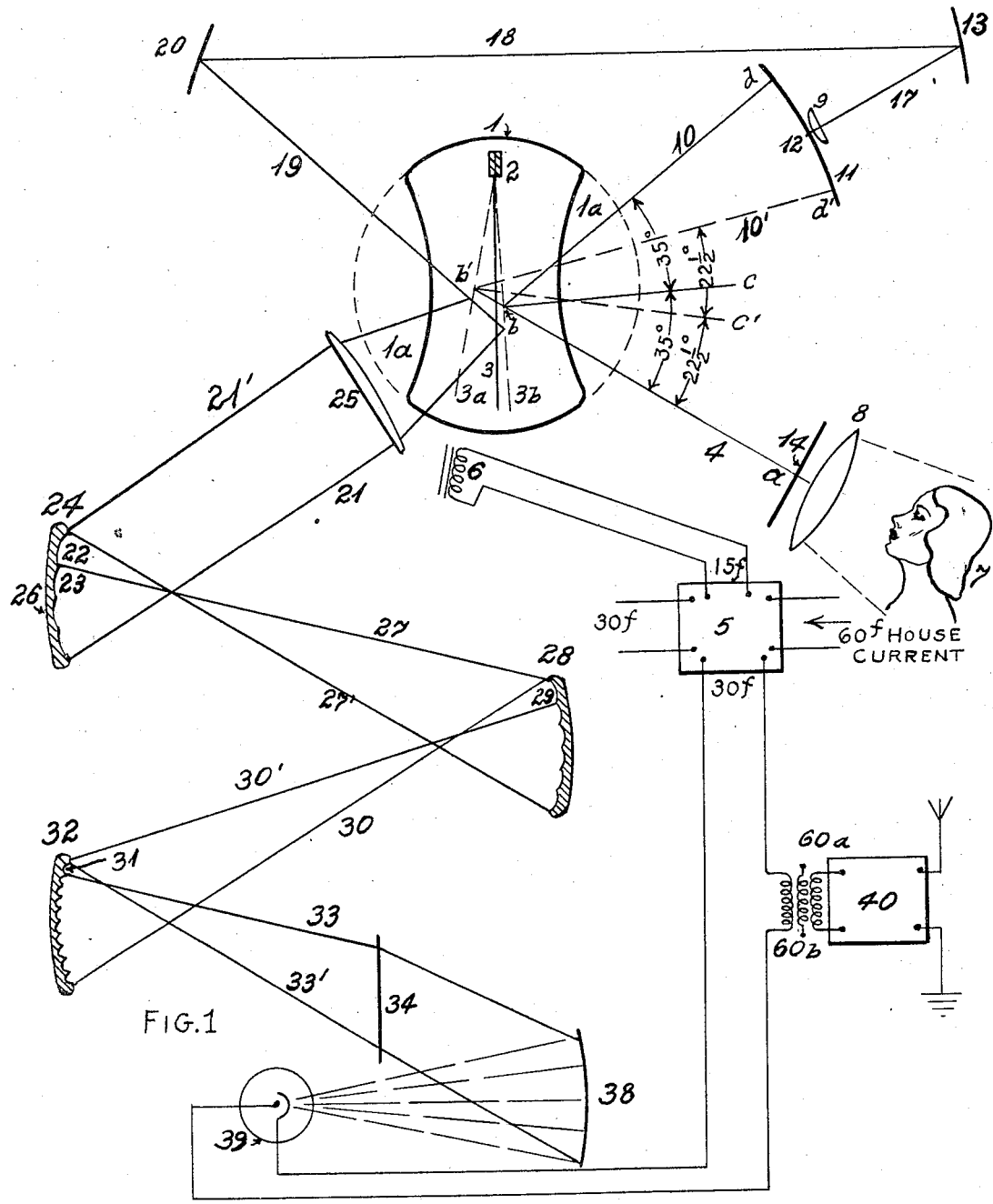
Fig. 1 is a diagrammatic view of an optical scanning style television transmitter.

Referring to the Fig. 1, an evacuated vessel 1 may be rigidly secured to the base of the transmitter by a non-magnetic cap or clamp (not shown). The vessel 1, is made of such material as, say, glass or any other transparent substance, on each side of which there may be a window-like depression 1a; a rigid non-magnetic standard 2 may be solidly secured to the base of the tube or vessel 1. A blade 3 of magnetic material may be rigidly secured at one end to the standard 2 while the blade 3 may be free at the opposite end to vibrate at will. The blade 3 may be silvered or chromium plated so as to reflect the image light rays 4 from image 7 with a maximum efficiency. The blade 3 may be of such dimensions as to be vibratory resilient to any desired frequency, or frames of the image to be scanned. The alternating current generator, oscillator, rectifier or transformer 5, may produce an alternating current of, say, fifteen cycles, per second, therefore a periodically increasing and decreasing electric current will flow in the electromagnet 6, in a positive and negative direction, and thereby produce an increasing and decreasing magnetic field of 30 alternations per second. At each maximum magnetic field strength, the blade 3 moves from the position 3b, to the position 3a, while when the magnetic field is zero the blade 3 is at a position shown with the solid line 3. To prevent the prime mover 3 from producing noises or being dampened, the vessel 1 is evacuated. The rays of the image may be concentrated by the lens 8 to produce the well known condensing and divergent conical beam of light, the nodal point of which may fall between b and b', while the focus of the image may be at 9. In order not to confuse the diagrams and still show the main principles concerned, nearly all beams or image rays are shown represented by the center line of the optical image light rays. When the blade 3 is at a position 3b, the co-angle of incident abc produces an equal co-angle of refraction cbd, and the center of the optical image is in the position shown by the solid line 10, while when the blade 3 moved to the position 3a, the co-angle of incidence of the optical image rays 8 is then ab'c', and the co-angle of refraction is c'b'd', that is to say, the optical image rays 10 move from d to d' with the blade 3. This forms the prime mover of the optical system, in its simplest form.

A non-transparent screen 11, Figs. 1 and 3, is located at nearly the focusing point of the image; preferably this screen 11 may be metal and painted black to absorb all the light rays of the image except that which passes through the slot 12, located, say, midway between d and d'. As the blade 3 moves from 3b to 3a, the optical beam is bodily moved past the slot 12 and scans the ordinate lines of the image.

The lens 9 may be located immediately next to the screen 11 or may form a part of the screen 11. The object of the lens is to focus the ordinates of the image on the reflector 13. A screen 14, Figs. 1 and 4, may be of transparent material, on which there may be inscribed by painting, printing, etc., black lines 15, leaving transparent lines 16 through which the rays of the image 7 will pass. Thus the image ray 4 and 10 consists of light laminae interlaced with dark laminae alternatively, each light laminae forming an alternate image ordinate, which is separate and distinct from the adjacent ordinate, likewise so are the rays 17, 18 and 19 but the latter rays carry the ordinates in succession to one another. The reflector 20 reflects the stationary rays to either the same prime mover 3, or another prime mover may be used. In the latter case the reflectors 13 and 20 may be dispensed with.

The character of the image rays 17, 18 and 19 can be compared to a large number of separate images succeeding one another in rapid succession, see Fig. 18. As the separate ordinates are reflected on the prime mover 3, and as the latter is in motion in a direction from 3b to 3a, it sweeps the rays 21' to maximum position 21 scanning all four bi-focal faces 22, 23 etc. of the scanning reflector 24, at which point the ordinate images are focused. A lens 25 may be interposed to keep the rays 21 to 21' within the limit of the bi-focal faces 22, 23 etc. Figs. 7 and 7a show this reflector 24. It should be understood that no attempt has been made to show the exact curvature of these reflectors which can be made concave, convex, plano-concave or any combination of concaveness and convexness, or separate four reflectors can be used to accomplish the same results. I prefer to use the bi-focal scanning reflectors which form a compact device of, say, four inches square or less. Each bi-focal face 22, 23 etc., in combination with the curvature of the silvered face 26 is so ground and of such a power that when the rays 21' traverse from one side of the bi-focal face 22 to the other side, the rays 27' are reflected and scan the entire scanning reflector 28, at which point the images are refocused. The scanning reflector 28 is similar to the scanning reflector 24, but has six bi-focal faces. Each bi-focal face 29 etc. is so ground that rays 30 sweep all the bi-focal faces 31, etc., of the scanning reflector 32 during the time the rays 27 sweep the one bi-focal face 29. Reflector 32 is similar to 28, but has ten bi-focal faces, and each bi-focal face 31, etc., traverses rays 33 over the entire screen 34, Figs. 1 and 8. As the rays 21' reach the end of bi-focal face 22 to position 27, it sweeps back the rays 27 momentarily, to the starting point on 28, and while ray 21 traverses the width of the bi-focal face 23, rays 27 again reflect gradually and scan the entire reflector 28. As there are 240 image light ordinates in an interlaced frame and as the no-light ordinates are slightly wider than the light ordinate, see Fig. 4, then during the time the rays 21' sweep each bi-focal face 22, etc. 240/4 or 60 light ordinates appear in succession on 22, while during the time rays 27 sweep by 29, 60/6 or ten ordinates appeared in succession on the bi-focal face 29, and during the time the rays 30' scan the bi-focal face 31, only 10/10 or one image ordinate remains on the bi-focal face 31 (see Fig. 8), and during the time this single ordinate traverses the width of the bi-focal face 31 the rays from that single image ordinate are swept by the entire screen 34, during the time of 1/480th of the time used by the prime mover 3 to move from 3b to 3a, or during the time of 1/480th of a frame a single image ordinate sweeps by the entire screen 34. Since light travels at nearly 186,000 miles per second, therefore at the moment the rays of an ordinate appear on reflector 13, they also appear at the same time on screen 34, and each point of the ordinate is reproduced in its natural state, therefore as rays 33 scan the screen 34 it repeats the same ordinate of the image through the slot in screen 34 as shown by lines 35. The screen 34 may be of transparent material, but all, except the diagonal line or slot 36, is made non-transparent, therefore, the only part of the rays 33 passing the screen 34, is a point at a time of the ordinate of a width of 36. As 36 is a diagonal the point sweeps from right to left, or vice versa, till all points of the image ordinate has been scanned. Fig. 8b shows a variation in the mode of this slot 36'. The fashion of each image ordinate as it appears on the bi-focal reflectors is shown at 37, Fig. 7. I prefer to have the optical system so arranged that the image focusing and refocusing points will take place at 12, 13, 20, 26, 28, 32 and 34. From 34 the rays from the dots may be focused by a lens or reflector 38 on the photo-electric cell 39, thereby developing an electric current impulses corresponding in strength at each instance to the elemental areas or image dots. The television electric impulse may be transmitted by wire, cable or by a television transmitter 40.

Referring to Fig. 4, it is evident that the rays 4, etc., contain but one-half the image, viz., the light rays passing through the transparent sections 16 of the screen 14. In order to scan the whole image, at the transmitter, I produce two identical images, as shown in Figs. 9 and 9a. Each point 41, 42, 42a, etc., of the image 7, reflects light spherically, as shown at point 41. The lens 43 concentrates all the rays perceived by it into a conical cone with a focus, say, at 44.

As is well known to the art, the spherically directed rays emanated by, say, point 41, are perceived by all the points on lens 43 and are refracted to travel by separate routes through the nodal point 45, and reconcentrated at the focusing point 41'. If any section of the image rays between, say, 46 and 47 is intercepted and reflected, a whole image may be focused on a screen, etc., for each section of that area of the image contains all the rays emanated from the image 7. The brightness of the image will only be such a fraction of image appearing at 44, as the ratio of the section intercepted is to the area of the whole image at the point of interception. 48, Fig. 9 and 9a is, say, a concave reflector, which may be cut in two, as shown by c, Fig. 9a. The two parts may be fitted tightly together. Each section a and b are slightly inclined to one another, and may be placed at any point between 46 and 47, Fig. 9, two identical images will be reflected in directions as shown by the rays center lines 49 and 50. It is evident that a reflector may be ground to that shape and used in place of a cut reflector. These two image rays may be focused on the reflectors 51 and 52, each of the latter reflectors takes the place of the original image 7, and each reflects the identical original image rays through the lenses 8a and 8b, and screens 14a and 14b. These two screens 14a and 14b may be identical to screen 14, Fig. 4, but they are so positioned that each is one ordinate, say, 1/480 of an image frame, laterally out from one the other. Therefore, the image rays 4a containing the image ordinates which are passing the transparent parts 16 in screen 14a are falling on the non-transparent parts 15 in the screen 14b. Likewise the image rays, 4b containing the image ordinates passing through the transparent parts 16 in screen 14b, are falling on the non-transparent parts 15 in screen 14a. The rays 4a and 4b may be applied to two separate prime movers 3, in a vacuum tube 1, or they may be directed to the same prime mover 3, in vacuum tube 1, which is positioned at a vertical angle to 46—47.

Each image ordinate after passing the slot 12 and lens 9, will become fixed on the reflector 13. Each image ordinate rays 18 may be reflected through separate prime movers and optical systems or they may be reflected through lenses or reflectors to the same prime mover and optical system. I prefer using two separate prime movers and optical systems. The result is interlaced images that interlace the ordinates of the image, frame by frame. The two image rays, however, appear simultaneously but are applied to two separate photo-electric tubes 39a and 39b, which enables me to produce electric impulse corresponding to but one image at a time, followed by impulses from the alternating frame.

Figure 10:
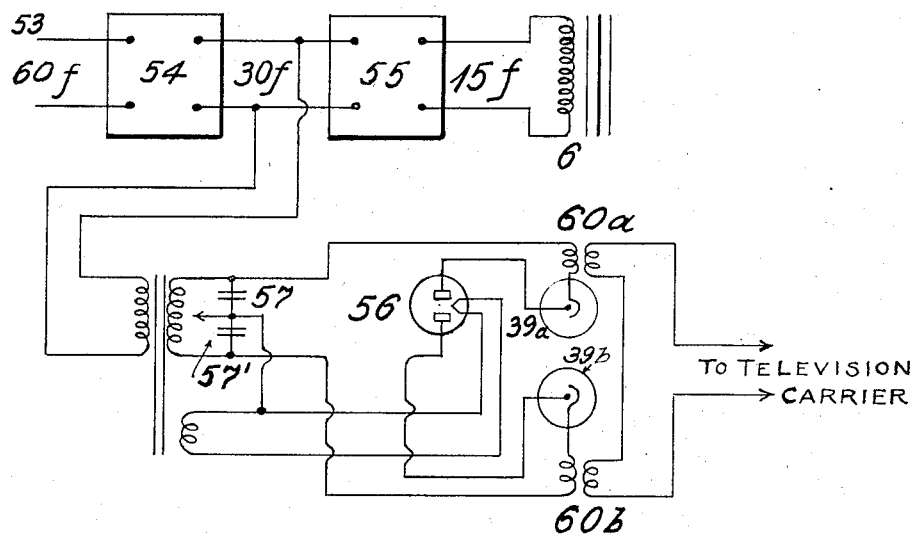
Fig. 10 is a diagrammatic view of the circuits employed at the transmitter to produce electrical impulses of interlaced images.
Figure 10A:
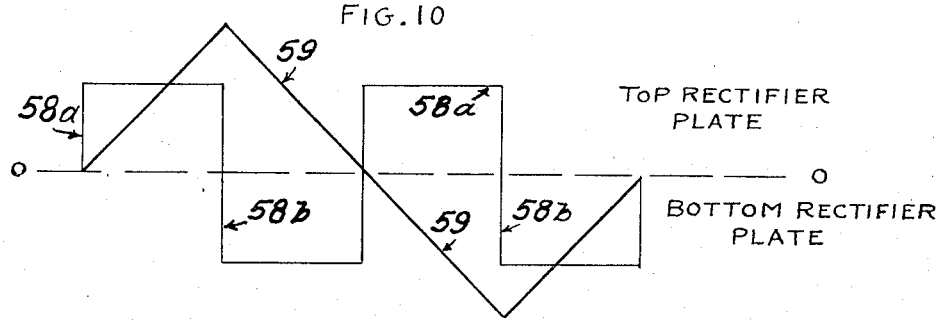
Fig. 10a is a view of electric current curves of same.
Figures 5, 5A:
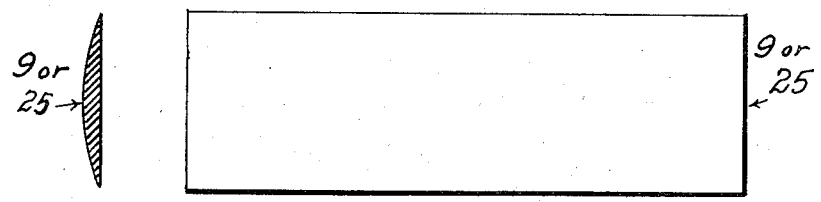
Fig. 5 is a side view of a lens employed in connection with Fig. 3.
Fig. 5a is a cross sectional view of same.

Referring to Fig. 10, the 60 cycle house current is plugged in at 53 and reduced by any well known method to 30 cycles by a reducing circuit 54. Another reducing circuit 55 is connected in parallel with the rectifying circuit 56, on the 30 cycle current. Due to the induction in the circuits and the condensers 57, 57', the resultant voltage applied to 39a is that to produce a 30 cycle current as shown at curve 58a, Fig. 10a, while the voltage applied to 39b is that to produce a 30 cycle current as shown at 58b. The reducing circuit 55, reduces the 30 cycle current to 15 cycles, as shown at curve 59, which is applied to the electromagnet 6. The result is that when the 15 cycle current increases from zero to maximum position and the prime mover 3 moves to position 3a only 39a is active and produces electrical impulses corresponding to the rays passing through screen 14a, or one alternate frame of the image. When the current in 6, decreases from maximum to zero, and the prime mover 3 returns to 3b, photoelectric cell 39b is active and produces electrical impulses corresponding to the rays passing the screen 14b. Thus while both image rays 10a and 10b are existing simultaneously, the television impulses applied to the amplifiers and carrier, through the series transformers 60a and 60b, correspond to television impulses of one interlaced frame only followed by the television impulses of the alternate frame. While only a transformer 60a—60b is shown in Fig. 1, it should be understood that this is for the sake of clarity of the diagram only, in practice I employ amplifiers, modulator, etc., before the television signals are applied to the carrier.

It is evident that by adding two bi-focal faces, see Fig. 2, to reflector 24a, 480 image ordinate areas are produced per interlaced frame, and 960 per complete image frame, thus producing 921,600 elemental areas per complete frame. By adding another reflector like 32 to the optical scanning system, 9,600 ordinate line areas may be scanned per complete frame, and 92,160,000 elemental areas per complete frame will be produced. Thus, the number of lines per image and the number of elemental areas, can be changed, by changing the number of, either the bi-focal faces of each reflector or by changing the number of optical scanning reflectors. As far as my optical scanning system is concerned a limitless number of line areas and elemental areas can be produced. The system is also adapted to optical scanning lenses as shown in Fig. 6. The curves of the lenses are exaggerated and no attempt was made to show the right curvature of each bi-focal face. Suffice it to say that each bi-focal face must be so ground that as each image ordinate passes one bi-focal face the rays must be refracted to sweep the entire succeeding bi-focal lens. In the optical system shown in Fig. 6, $4 \times 8 \times 16$ or 512 lines per frame is produced.

The television receiver may be produced by the reverse action of the transmitter, however, to produce a very bright image and utilize the maximum efficiency I prefer to operate the television receiver as shown in Fig. 2. The electrical impulses, which correspond in intensity to the elemental areas of the image, are received on the antenna 61 of the television receiver 62. The signal impulses are amplified, and a source of light like an arc-light, crater-tube, gas-tube, etc., 63, is modulated by these impulses to vary the brightness of the source of light corresponding to the television impulses. A reflector 64 concentrates nearly all the light rays on the aperture 65 in the screen 66. The rays 67 corresponding to the elemental areas of the image, are applied to the prime mover 3 of the tube 1, Fig. 2. At the receiver, identical reference numbers bear the prefix r. The optical system was fully explained in connection with the television transmitter, Fig. 1, and need not be repeated here. At the receiver, however, the rays 67, 27, 30 and 33 are the rays of elemental areas, or dots of the image only. During the time rays 33 move to the position 33', the electrical television impulses received by the antenna 61, and with it the light strength of 63 continuously changed to respond to the elemental areas of each ordinate of the image, therefore the light line described on the prime mover 3o corresponds exactly to an image ordinate, as transmitted by the transmitter, in dot by dot impulses. The prime mover 3o is exactly like the prime mover 3r, and is located within a vacuum envelope, but is positioned at right angles from 3r, that is, the line described by the rays 33r', in moving to the position 33r, is placed across the width of the blade 3o, the blade 3o is deflected to the positions 3oa and 3ob, therefore the ray 68—68' of the line or ordinate of the image may be reflected directly on a screen 69, or the rays 68—68' may be reflected on a reflector 70, and in turn reflected on the screen 69. As the prime mover 3o moves from the position 3oa to 3ob one interlaced frame is scanned while when the prime mover 3o moves from 3ob to 3oa the alternate interlaced frame is scanned for the electrical impulses received by 61 correspond exactly to this. The ordinate lines are moving in a direction normal to 69 and 70. Since the impulses of each interlaced frame at the transmitter are applied to the transmitter carrier in series they so appear automatically at the receiver, also each ordinate is followed by a no-light ordinate automatically, in the same manner as received by the receiving antenna 61. The devices may be positioned in a television receiver cabinet in a manner shown at Fig. 2, so the screen will be at the top of the cabinet.

The scanning reflector 24r, Fig. 2, is shown with six bi-focal faces, this is merely to show, that adding two bi-focal faces to this reflector, will double the number of lines of the image. If the receiver Fig. 2 is to operate with the transmitter, Fig. 1, they must both have the same number of scanning reflectors and each reflector must have the same number of bi-focal faces. In this case 24r must have four bi-focal faces, the same 24, Fig. 1, has.

To avoid the prime mover 3, from retaining residual magnetism, the blade may be made of nickel-iron or other alloy. It is also evident that scanning reflectors or lenses may be used in combination in one optical scanning system. The scanning reflectors 24, 28 and 32 or 24r, 28r and 32r are set so that the rays form isosceles triangles, the reflectors 24 and 24r must be so corrected by the curvature of the silvered side that as the prime mover 3 moves, it will always keep the rays 27 and 27r moving within the limits of the bi-focal faces of reflectors 28 and 28r. The stroke of the prime mover 3 is shown to be long from 3a to 3b, this is not at all necessary, for the ray 21 may be focused on one bi-focal lens and then refracted to scan the entire scanning reflector 24, thus a small movement of 3 will suffice to produce optical scanning. The optical scanning lenses or reflectors may be pressed glass, etc., made from metal dies ground to a high precision. This will produce optical scanning lenses or reflectors at a cost of a few cents each. I have thus accomplished the object of the invention, to produce a cheap television receiver, yet with any number of lines to the image, and since reflectors are highly efficient, nearly all of the light produced at 63 will simultaneously appear at each elemental area or dot, at the receiver screen. Hence I have produced a large bright and natural image at a high fidelity and at low cost. The limiting factor of the size of the image is the size of the aperture 65 of the screen 66. If the screen 69 is to be at a theater, it may be ten feet by ten feet, the aperture 65 will then be ¼ inch square, producing 480×.25 or 120 inches or 10 feet image ordinates, with it we may use larger optical scanning reflectors 24r, 28r and 32r and larger prime movers 3r and 3o, and a stronger source of light 63.

The prime mover 3 has up to now been described as an electromagnetic blade. It is evident that the prime mover may be an electrostatic device, Fig. 11, b, the metal block 71 may be shaped with a concaveness more than the natural shaped concaveness of the diaphragm 3s, between the diaphragm and the block 71 is an insulation 72, and all three members held securely together by a metal ring 73 and screws insulated from the ring 73 and diaphragm 3s. The structure may be rigidly secured to the base of a vacuum tube 1s, which may have two prongs with leading-in wires (not shown), leading-in the current to the wires 74 and 75. An opening 76 permits the space between the diaphragm and the insulation 72 to be exhausted easily when the tube 1s is evacuated. The potential of the A. C. current may be applied to the wires 74 and 75, then when 71 and 3s are of unlike potentials, the diaphragm 3s will be attracted to the shape of 71 and 72, that is, the diaphragm 3s will become more concave, this will change the angle of incidence between the ray 4s, and the diaphragm 3s, and consequently the image rays 10s will move to and fro. The block 71 may be connected to the middle tap of a rectifying transformer and the diaphragm 3s may be connected to the filament side of the circuit. Fig. 11, a, shows the unit with the diaphragm 3s which may have slots 77 cut in same, so that the diaphragm may easily lend itself to the change in concaveness. Fig. 11, c, shows the diaphragm 3s with bends or grooves for the same purpose. The element may consist of two diaphragms separated by insulation, suitably held by rings. I have thus produced an electrostatic prime mover 3s to be used as heretofore explained.

The prime mover may also be an electrophysical device. Referring to Figs. 14 and 15, the prime mover 3p may consist of a thick metal ring 78, in which ring is tightly secured a piezoelectric crystal 79, such as, say, quartz cut on the electric axes and ground slightly concave. Each face of the crystal 80 and 81 is silvered and highly polished. Two angular metal rings 82 and 83, Fig. 14, a, are tightly pressed in place against the silvered faces 80 and 81, to make electrical contact and are held there by rivets or screws 84 and 85. The screws 84 and 85 are insulated from the ring 78, by insulating rings 86 and 87 and insulating sleeves 88. The whole device is secured to the base of a vacuum tube with two prongs, not shown, connecting to terminals 74p and 75p, and in turn connecting to rings 82 and 83. As the voltage is applied to 74p and 75p, and to the rings 82 and 83, which in turn make contact with the silvered faces 80 and 81 respectively, the voltage thus applied to the silvered faces 80 and 81 exerts an electric pressure on the piezoelectric material and forces it to become longer in all directions, but as the metal ring 78 does not allow the piezoelectric diaphragm to extend externally, that is to increase in diameter, the piezoelectric diaphragm 79 extends by increasing its concaveness, thereby changing the angle of incidence between the image ray 4p and the face 81, causing the rays 10p to sweep by the slot 12. Thus I have produced an electro-physical prime mover 3p.

Up to this point I have shown where by sweeping the rays 10, they pass the slot 12, and produce ordinates and elemental areas of the image. It is evident that if the angle between the image rays 4 and 10 is small the movement of the rays 10 is small. With the prime mover heretofore explained, and thus hereinafter explained, a circular or spiral scanning may also be accomplished. In that case a circular interlacing screen 88, Fig. 13 takes the place of the screen 14, Figs. 4 and 1, thus the image rays 4 and 10 become concentric cylinders of light, interlaced by concentric cylinders of darkness. The screen 89, Fig. 12 takes the place of screen 11, Figs. 3 and 1; the screen 89 has two semi-circular slots 90. The prime mover merely diverges and converges the image rays 10, thereby scanning the image circularly. As the image also sweeps slightly sidewise the space within 90 is thus also scanned. The optical scanning reflectors or lenses 24c, Fig. 6a, then becomes circular. The screen 34 then may have a transparent spiral line 91, Fig. 19 instead of the diagonal 36. At the receiver, the screens are rearranged to meet requirements. The method of operation of the devices of the optical scanning is the same as heretofore explained and does not need to be repeated again.

Referring to Fig. 16, a prime mover 3c consisting of a ring made up of two pieces 92 and 93, of conducting material. 92 may be electrochemically positive to 93, two pieces of insulating material 94 and 95 form a circular holder of the device which forms a ring in which are secured two concave glasses 96 and 97 a diluted acid 98 fills the space between the concave glasses. A space 99 is provided for expansion of the acid and to hold any gas developed under operation; these gases condense when the device is not operating. A very low voltage, 30-cycle, alternating current, is applied to the terminals 74c and 75c of the chemical-optical cell. Each alternation of the electric current cycle causes the positive ion of the acid 98 to become attached to the electro-negative plate 93. and the negative ion to become attached to the electro-positive plate 92, while the second alternation in each electric cycle the ions are returned to the electrolyte. The specific gravity and the refractive index of the electrolyte thus changes twice per electric cycle. The image rays 4c will thus diverge and contract twice per each cycle of the low voltage electric alternating current. I have thus developed an electrochemical prime mover for the optical scanning system.

The cell described heretofore in connection with Fig. 16 may be also an electro-optical cell. The two plates 92 and 93 may be of any electrically conducting material, and 98 may be any crystalline solution like for instance, say, a solution of sugar, salt, etc. Each alternation causes a change in the crystalline state of the solution, while the succeeding alternation reverses the state of the crystalline substance. In each case there is a change in the refractive index of the solution and a divergence and convergence of the rays 4c. I have thus developed an electro-optical prime mover for the optical scanning system.

The rays, reflectors, etc., of the scanning system, may be, as far as possible, encased in compartments to prevent stray rays from refracting or reflecting from one part of the scanning system to other parts.

Modern alternating current power plants develop alternating currents that remain at, say, 60 cycles per second, with very little variation, however, two separate power plants may be out of phase by a certain angle of lead or lag, at all times. This is more so troublesome due to the fact that each transformer supplying electric current to residences may be out of phase at different times depending on its load. Referring to Fig. 17, 100 is the primary of a transformer, and 101 the secondary. The primary 100 is wound in a grooved iron ring 102, and the secondary 101 in a similar grooved ring 103. The primary 102 is secured to the structure 104 and the secondary mounted on the shaft 105. The secondary 101 may be turned by knob 106 through a certain angle. The leads 107, 107, Fig. 17, may be connected to leads 53, Fig. 10, all that is necessary to frame the image is to turn knob 106 till the image is perfectly framed, and at that condition the current supplied to the television power supply at the receiver is in phase with the transmitter electric current.

As stated before the vacuum tube I is held tight in position by a non-magnetic cap or holder (not shown), securely fastened to the non-magnetic base of the television set. Secured to this cap and base may be mounted the electro-magnetic coil 6, in such a manner that it may slide slightly towards the position of the blade 3 when no current is flowing in the electromagnet 6. Thus the stroke of blade 3 can be increased or decreased at will and thus properly framing the image.

From the above it can be seen that I have provided a television scanning system wherein the optical scanning system can produce a limitless number of elemental areas, at the receiver the image will be large, bright, and clear, and yet cheap, and easily controlled and synchronized from house lighting power available by the public and operating at low voltage.

My invention is not limited to the specific arrangement of the apparatus illustrated, nor to the shapes of the lenses, reflectors, slots or transparent lines or curves, but may be variously modified without departing from the spirit and scope of my invention.

I claim as my invention:

1. In the art described, means for producing an image, means for reducing the image into line areas, a prime mover to move the rays reflected from the line areas, bi-focal means disposed to receive the reflected rays comprising a plurality of reflectors each embodying a plurality of multi-focal lenses to evolve therefrom a plurality of light ray movements, and means for reducing evolved light ray movements into rays of elemental areas of the image.

2. In the art described, means for receiving electrical impulses corresponding to elemental areas of an image, means for influencing a source of light by the electrical impulses, means for moving the light rays from the said source of light including a prime mover, a plurality of spaced lens reflectors each embodying a plurality of bi-focal lenses, means for scanning these reflectors by the moving light rays to evolve therefrom a plurality of light ray movements, and means for scanning a screen by the light rays and reproducing an image corresponding to that at the transmitter.

3. In the art described, the method comprising receiving electrical impulses corresponding to elemental areas of an image, influencing a source of light by the impulses, moving the image modulated light rays by a prime mover, multiplying each ray by successive stages thereby evolving a plurality of light ray movements, reducing each plurality of light movements to a light point, and scanning a screen by the said light points and reproducing an image corresponding to that at the transmitter.

4. In the art of scanning, a one piece curved reflector lens comprising a number of longitudinal lenses adjacent to one another embodied in the said reflector to form a plurality of bi-focal lenses, a moving light beam from a light source, and means to coordinate the curvature of the lens or reflector, the bi-focal lenses and the moving light beam to produce scanning of the light beam on a screen.

5. Optical scanning apparatus for television comprising an image modulating moving light beam, a plurality of reflector lenses each including a plurality of multi-focal lenses, said reflector lenses being disposed relative to each other so that a light line beam may be successively moved from a first multi-focal lens of a reflector lens to all of the multi-focal lenses of the next reflector lens, whereby each light line beam is ultimately produced in a multiple of the multi-focal lenses, and means for scanning a screen by the said light beams to produce the image.

6. Optical scanning apparatus for television comprising a light beam corresponding to the line areas of an image, a plurality of reflector lenses each including a plurality of multi-focal lenses, said reflector lenses being disposed relative to each other so that the light line beam may be successively moved from a first multi-focal lens of a reflector lens to all of the multi-focal lenses of the next reflector lens, whereby each light line beam is ultimately produced in a multiple of the multi-focal lenses, and means for successively reducing the line beams to elemental light points for change to electrical impulses.

7. In the art described, means for receiving electrical impulses corresponding to elemental areas of an image, means for influencing a source of light by the electrical impulses, means for moving the light through a predetermined angle, means for evolving therefrom a plurality of light movements comprising a plurality of reflectors spaced in alternately opposed relation, each reflector having a predetermined number of bifocal faces, means for scanning a screen area by the light movements, and reproducing an image corresponding to that at the transmitter.

8. In the art described, scanning an image and reducing it to line areas, reflecting the line areas successively thereby producing a light frame corresponding to an image frame, producing successively a plurality of light frames each corresponding to a number of line areas comprising a fraction of an image frame, producing successively thereto a series of a plurality of light frames each series corresponding to a predetermined vectorally decreasing number of line areas thereby reducing these light frames to line areas, and scanning the line areas to produce elemental areas of the image.

9. In the art described, producing an image modulated light beam, moving the light beam and producing a light line corresponding in intensities to an image frame, producing successively a plurality of light lines each corresponding to a number of line areas comprising a fraction of an image frame, producing successively thereto a series of a plurality of light frames, each series corresponding to a predetermined vectorally decreasing number of line areas thereby producing line areas, and reflecting these line areas and reproducing the image.

10. In the art described, means for scanning an image and reducing it to line areas, means for reflecting the line areas successively to produce a light frame corresponding to an image frame, means for producing successively a plurality of light frames each corresponding to a number of line areas comprising a fraction of an image frame, means for producing successively thereto a series of a plurality of light frames, each series corresponding to a predetermined vectorally decreasing number of line areas to reduce the light frames to line areas, and means for scanning the line areas to produce elemental areas of the image.

11. In the art described, means for producing an image modulated light beam, means for moving the light beam to produce a light line corresponding in intensities to an image frame, means for producing successively a plurality of light lines each corresponding to a number of line areas comprising a fraction of an image frame, producing successively thereto a series of a plurality of light lines, each series corresponding to a predetermined vectorally decreasing number of line areas to produce line areas and means for reflecting the line areas and reproducing the image.

12. In the art described, apparatus comprising two screens with alternate adjacent transparent and non-transparent line areas spaced laterally a predetermined degree, means for reflecting two images each comprising alternate lines of an original through the said screens, means for scanning the light rays emanating from these images, and means to produce interlaced elemental areas of the image.

13. A reflector lens for television scanning comprising an integral member including a plurality of multi-focal lenses disposed in side by side converging relationship.

14. In the art described, means for producing a moving light beam, a multi-focal multi-lens reflector, means for scanning the multi-focal lenses of the reflector by the moving light beam thereby producing a plurality of moving light beams corresponding to the number of multi-focal lenses embodied in the reflector, a plurality of multi-focal multi-lens reflectors spaced adjacent to one another and adjacent to the aforesaid first multi-focal multi-lens reflector, means for scanning successively each of the multi-focal lenses of the reflectors by each of the plurality of moving light beams and thereby producing a plurality of moving light beams equal to the number of multi-focal lenses embodied in the first reflector multiplied by the number of multi-focal lenses embodied in each of the succeeding reflectors.

15. In the art described, the method of scanning a moving light beam comprising scanning a multi-focal multi-lens reflector by a moving light beam thereby producing a plurality of moving light beams corresponding to the number of multi-focal lenses embodied in the reflector, scanning in turn by each moving light beam a succeeding plurality of multi-focal multi-lens reflectors spaced adjacently to one another and adjacent to the aforesaid multi-focal multi-lens reflector and producing a plurality of moving light beams equal to the number of multi-focal lenses embodied in the first reflector multiplied by the number of multi-focal lenses embodied in each of the succeeding reflectors.

16. In the art described, means for producing a moving light beam corresponding to the line areas of an image, a multi-focal multi-lens reflector, means for reflecting the said light beam and scanning the multi-focal reflector thereby producing a plurality of moving light beams, a plurality of multi-focal multi-lens reflectors spaced adjacently to one another and adjacent to the aforesaid first multi-focal multi-lens reflector, means for reflecting in turn each of the plurality of the moving light beams and scanning each of the multi-focal lenses of the successive reflectors thereby producing a plurality of moving light beams each corresponding to an image line area, and means for reducing each image line area into an elemental area of the image.

17. In the art described, producing a moving light beam corresponding to the line areas of an image, scanning a multi-focal multi-lens reflector by the said light beam thereby producing a plurality of successively moving light beams, scanning in turn a plurality of adjacently spaced multi-focal multi-lens reflectors by the successively moving light beams thereby producing a plurality of moving light beams each corresponding to a line area of an image, and resolving these line area beams into beams corresponding to elemental areas of an image.

18. In the art described, means for producing a moving light beam corresponding to the line areas of an image, means for scanning a multi-focal multi-lens reflector by the light beam thereby producing a plurality of successively moving light beams, a plurality of multi-focal multi-lens reflectors spaced alternately to one another and to the aforesaid reflector, means for scanning in turn these reflectors by the successively moving light beams thereby producing moving light beams each corresponding to a line area, means for reducing these line areas to light beams corresponding to elemental areas, means for converting the light beams to electrical impulses, means for transmitting and receiving these electrical impulses, means for influencing a source of light by these impulses, means for scanning a multi-focal multi-lens reflector by the source of light thereby producing moving light beams, a plurality of multi-focal multi-lens reflectors spaced alternately to one another and to the aforesaid reflector, means for reflecting in turn each of the plurality of the moving light beams and scanning each of the multi-focal lenses of the successive reflectors thereby producing moving light beams corresponding to elemental areas of an image, and means for scanning a screen by these beams and reproducing an image.

19. In the art described, producing a moving light beam corresponding to the line areas of an image, scanning a multi-focal multi-lens reflector by the said light beam thereby producing a plurality of successively moving light beams, scanning in turn a plurality of alternately spaced multi-focal multi-lens reflectors by the successively moving light beams thereby producing a plurality of moving light beams each corresponding to a line area of an image, resolving these line area beams into light beams corresponding to elemental areas of an image, converting these light beams into electrical impulses, transmitting receiving and reconverting these electrical impulses into an image modulated light beam, scanning a multi-focal multi-lens reflector by the light beam thereby producing a plurality of successively moving light beams, scanning in turn a plurality of alternately spaced multi-focal multi-lens reflectors by these moving light beams and thereby producing moving light beams corresponding to elemental areas of an image, and scanning a screen by these light beams and reproducing the image.

20. In the art described, means for receiving electrical impulses corresponding to elemental areas of an image, means for influencing a source of light by these impulses, means for scanning a multi-focal multi-lens reflector by the source of light thereby producing moving light beams, a plurality of multi-focal multi-lens reflectors spaced alternately to one another and to the aforesaid reflector, means for reflecting in turn each of the plurality of the moving light beams against each of the multi-focal lenses of the successive reflectors thereby producing moving light beams corresponding to elemental areas of an image, and means for scanning a screen by these beams and reproducing an image.

21. In the art described, the method of receiving electrical impulses corresponding to elemental areas of an image, influencing a source of light by these impulses, scanning a multi-focal multi-lens reflector by the source of light thereby producing moving light beams, scanning in turn a plurality of alternately spaced multi-focal multi-lens reflectors by these moving light beams thereby producing a plurality of light beams corresponding to elemental areas of an image, scanning a screen by these light beams and reproducing the image.

GEORGE WALD.